United States Patent [19]

Sasakura et al.

[11] Patent Number: 4,690,122

[45] Date of Patent: Sep. 1, 1987

[54] IGNITION CONTROL SYSTEM FOR INTERNAL COMBUSTION ENGINES

[75] Inventors: Hachirou Sasakura, Inuyama; Masakuni Tsujimura, Anjo, both of Japan

[73] Assignee: Nippondenso Co., Ltd., Kariya, Japan

[21] Appl. No.: 870,144

[22] Filed: Jun. 3, 1986

[30] Foreign Application Priority Data

Jun. 4, 1985 [JP] Japan .................................. 60-121253

[51] Int. Cl.$^4$ ............................................. F02P 5/00
[52] U.S. Cl. ................................. 123/609; 123/615; 123/417
[58] Field of Search ............... 123/609, 610, 611, 414, 123/416, 417, 615

[56] References Cited

U.S. PATENT DOCUMENTS

| | | | |
|---|---|---|---|
| 4,440,141 | 4/1984 | Tsujimura et al. | 123/609 |
| 4,469,081 | 9/1984 | Mate | 123/609 |
| 4,625,704 | 12/1986 | Wheelock | 123/609 |
| 4,627,398 | 12/1986 | Koike | 123/609 |

*Primary Examiner*—Ronald B. Cox
*Attorney, Agent, or Firm*—Cushman, Darby & Cushman

[57] ABSTRACT

In an ignition control system for the internal combustion engine, a reference angle sensor detects the rotational speed of the internal combustion engine, and detects a point near the top dead center, and generates a reference angle signal. An angle sensor similarly detects the rotational speed of the internal combustion engine, and discriminats the rotational speed for each predetermined angle, and generates an angle signal. A microcomputer includes an output compare register, a free-running counter and a timer control status register, and computes the ignition timing and energization time of the ignition coil in response to a reference angle signal from the reference angle sensor and an angle signal from the angle sensor.

4 Claims, 10 Drawing Figures

IGNITION CONTROL SYSTEM FOR INTERNAL COMBUSTION ENGINES

BACKGROUND OF THE INVENTION

The present invention relates to an electronic ignition control system using a microcomputer for controlling the ignition of the internal combustion engine.

In an electronic ignition control system using a microcomputer, as described in detail in Japanese Patent Laid-Open Publication No. 193766/82, the energization of the ignition coil is controlled by computing an optimum ignition timing and the time of energization on the basis of data relating to the operating conditions including engine revolutions such as the engine rotational speed, amount of intake air, temperature of cooling water and the battery voltage of the internal combustion engine. In order to realize the ignition timing and the energization time thus computed, it is necessary to start energization at a predetermined crank angle corresponding to the energization time and cut off the energization at a predetermined crank angle corresponding to the ignition timing. There would be posed no problem if it were possible to detect the rotational angle of the crankshaft at a given moment to produce an ignition signal. The mechanical limitations (number of teeth) of the angle sensor for detecting the crank angle or the limitation of the processing time of the microcomputer, however, makes it impossible to detect and control the crank angle at a given moment. Actually, therefore, intervals of a definite number of angle signals are converted into time and interpolated to determine the crank angle, thereby controlling the energization of the ignition coil.

An ignition control system conventionally designed for this purpose will be explained below with reference to the timing chart of FIG. 9.

In FIG. 9, (a) represents a reference angle signal generated at each 180° of crank angle (hereinafter referred to as "CA"), (b) an angle signal generated for each 30° of CA, (c) an interruption by the angle signal (I.C.I processing), (e) a time difference Δt between an offset value set in an output compare register and a free-running counter, (f) an ignition signal and (g) start of ignition.

In starting the energization, the angle remaining from the input timing of the angle signal (n+2) immediately before the energization start time computed to the energization start time is converted into a length of time by the prevailing engine speed. An offset value corresponding to the resulting time length is set in an output compare register in the microcomputer, and an output flag is set to "1" at the same time. The value set in the output compare register is compared with the value on the free-running counter which runs free and keeps counting the time. When these two values come to coincide with each other, that is, when a time length corresponding to the offset value has elapsed, the ignition signal (f) is raised to "high" level in accordance with the output flag thereby to start energization of the ignition coil.

In cutting off the energization, the angle remaining from the input time of the angle signal (n+4) immediately before the ignition timing to the ignition timing is converted into a length of time in similar manner, and the offset value corresponding to the particular time length is set in the output compare register while at the same time setting the output flag to "0". When a time length corresponding to the offset value thus set has elapsed, the ignition signal (f) is reduced to "low" level in accordance with the output flag thereby to cut off the energization of the ignition coil. At the time of cut-off of energization, the ignition plug is fired.

As explained above, the conventional control systems require a computation which must be executed by interruption each time of input of an angle signal, and this complicated computation processes at the time of interruption increases a program load. If the engine stalls immediately after the ignition signal (f) is raised to "high" to start energization, the angle signal (n+4) for cutting off the energization fails to be input, and therefore the ignition coil continues to be energized, often causing such troubles as overheating or burning of the ignition coil and the power transistor. Further, in view of the fact that the angle remaining from the input time of the angle signal to the time of energization start is converted into a length of time on the basis of the rotational speed of the engine determined from the intervals of generation (T180) of a reference angle signal, the rotational speed determined from the intervals of the reference angle signal is considerably displaced from the actual rotational speed at about the time of energization start under an abrupt acceleration such as in the case of racing. As a result, the energization start time is delayed and it becomes impossible to secure the time for energization of the ignition coil, and an accurate ignition fails.

FIG. 10 is a characteristic diagram simulating the energization time for abrupt acceleration under no load shown as an example of failure to secure the energization time.

In FIG. 10, the abscissa represents the number of ignitions after abrupt start of acceleration, character Ne the engine rotational speed, character A an energization angle obtained normally for the particular engine rotational speed (the angle of engine rotation during energization of the ignition coil), and character B a value obtained by simulating the transient energization angle for abrupt acceleration. This indicates that the energization angle B for abrupt acceleration under no load is extremely reduced after several ignitions following the start of acceleration, and in an extreme case, the energization angle becomes negative, that is, the ignition coil may actually fail to be energized.

SUMMARY OF THE INVENTION

Accordingly, the object of the present invention is to provide an ignition control system for the internal combustion engine in which, in order to solve the problems mentioned above, the load on program at the time of interruption process is reduced, the ignition coil is not overheated even if the engine stalls immediately after start of energization, and the energization time for the ignition coil is secured even during abrupt acceleration, thus making accurate ignition possible.

According to a first aspect of the present invention, there is provided an ignition control system for computing the energization time and ignition time by use of a microcomputer thereby to control the energization of the ignition coil from a reference angle signal produced from a reference angle sensor for detecting the rotational speed of the engine thereby to detect a point near the top dead center, an angle signal produced from an angle sensor for detecting the rotational speed for each predetermined angle, and data relating to the operating conditions such as the amount of intake air, comprising means for starting or cutting off the energization of the ignition coil in accordance with the value set in a timer control status register and making it possible to meet a request for output compare interrupt in a microcomputer at the time point when the value in an output compare register in the microcomputer coincides with the value on a free-running counter, first means for setting in the output compare register the sum of the present time and a value corresponding to a predetermined maximum energization time and setting a value for cutting off the energization in the timer control status register at the time of energization start, second means for setting again in the output compare register a value corresponding to the angle remaining to the ignition timing plus the present time at the time of input of an angle signal immediately before the ignition timing computed on the basis of the operating conditions, and third means for setting in the output compare register a value corresponding to the cut-off time computed on the basis of the operating conditions plus the present time while at the same time setting a value for starting the energization in the timer control status register at the time of cut-off of the energization of the ignition coil.

According to a second aspect of the present invention, there is provided an ignition control system for the internal combustion engine comprising means for starting or cutting-off the energization of the ignition coil in accordance with a value set in a timer control status register and meeting a request for output compare interrupt in a microcomputer at the time point when the value in an output reference register in the microcomputer coincides with the value on a free-running counter, first means for setting a value corresponding to the time before the energization cut-off time plus the present time in the output reference register and a value for cutting off the energization in the timer control status register, second means for setting again in the output compare register a value corresponding to the time representing the angle remaining before the ignition timing that is stored in a memory plus the present time, at the time of input of an angle signal immediately before the ignition timing computed on the basis of the operating conditions, third means for setting a value corresponding to the time before the energization start time plus the present time in the output compare register and setting a value for starting the energization in the timer control status register, and fourth means for determining whether or not the ignition coil is energized and if the ignition coil is not under energization, setting in the output compare register the same value as the value set therein by the second means at the time of input of the angle signal immediately preceding but one to the ignition timing.

In the first aspect of the present invention, the first means is realized by the processing of output compare interrupt the microcomputer, and the second means by the processing of input capture interrupt with an angle signal, and therefore the computation for the interruption for each input of the angle signal is eliminated, thereby reducing the load on the program. Also, the interruption process for setting the energization cut-off timing for the ignition coil at the second means is nothing than a single process of setting the output register to a smaller value again, and therefore, a complicated input capture interrupt is not required, but the program load is reduced while maintaining the accuracy of energization cut-off timing. Further, in view of the fact that a maximum energization time is set in the output compare register by the first means, the energization is always cut off after the lapse of the set maximum energization time even in the case of an engine stall during energization of the ignition coil, thus preventing the ignition coil from being overheated or otherwise troubled.

In the second aspect of the invention, on the other hand, the process of the fourth means is executed only in the event that energization is not yet started at the time of input of an angle signal preceding but one to the ignition timing. The fourth means sets in the output compare register the same value as in the processing of the second means for setting the cut-off interruption timing finally, and therefore the value in the output compare register coincides with the value in the internal timer, thus starting the energization of the ignition coil, before the input of the next angle signal. Then during the period before energization cut off by the process of the second means, the energization time representing the rotational angle corresponding to the intervals of the angle signals is secured. Even in the transient period of abrupt acceleration of the engine, therefore, a predetermined energization angle is secured thereby to start the ignition coil accurately. Furthermore, the process of the fourth means is the same as that of the second means but is executed at a different timing, thereby reducing the program load.

As explained above, in the first aspect of the invention, since a predetermined maximum energization time is set at the time of energization start and the energization cut-off time is corrected immediately before the ignition timing, the load on the program can be reduced at the time of interruption processing while securing the accuracy of the ignition timing. As a result, the processing time can be reduced on the one hand, and the energization is accurately cut off even in the case of an engine stall on the other hand.

The advantage of the second aspect of the invention is that since means is provided for checking the energization of the ignition coil at the time of input of an angle signal next but one preceding but one to the ignition timing, and for starting the energization early in forcible manner if the energization angle is not secured, it is possible to secure a predetermined energization angle even during a transient period such as abrupt acceleration, thus permitting accurate ignition.

DESCRIPTION OF THE PREFERRED EMBODIMENTS

An embodiment of the present invention will be described specifically with reference to the attached drawings.

Figure 1:
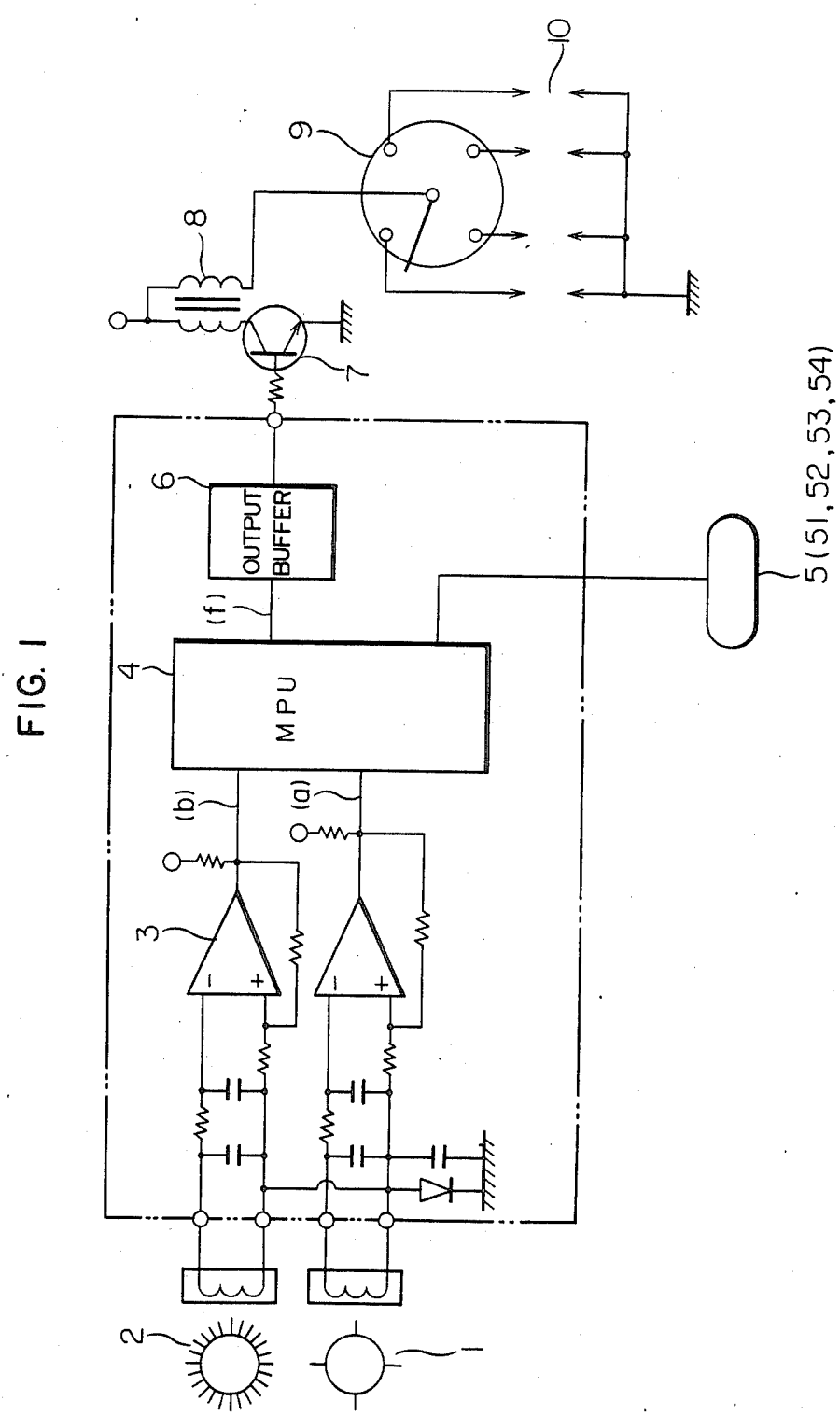
FIG. 1 is a circuit diagram of an ignition control system according to the present invention.
Figure 2:
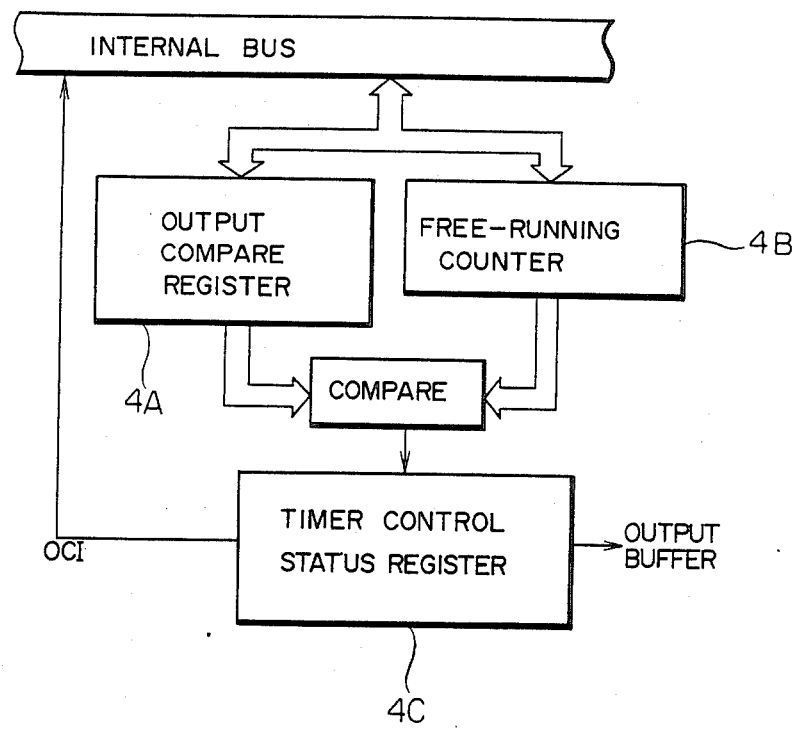
FIG. 2 is a diagram showing a configuration of a microcomputer for a control system according to the present invention.

A circuit diagram of an ignition control system according to the present invention is shown in FIG. 1.

A reference angle sensor 1 and an angle sensor 2 are built in a distributor and make up a detector of an electromagnetic pick-up type for detecting the rotational angle of the crankshaft. The reference angle sensor 1 generates a reference angle signal at a specified crank angle advanced several degrees from the top dead center of each cylinder, while the angle sensor 2 generates an angle signal each 30° rotation of the crankshaft. The voltage signals from the reference angle sensor 1 and the angle sensor 2 are introduced to a waveform shaping circuit 3, and applied to a microcomputer 4 as a reference angle signal (a) and an angle signal (b) shaped in pulses respectively.

The microcomputer 4 is also connected with operating-condition sensors 5 including an air flow meter 51 for detecting the amount of intake air, a throttle sensor 52 for detecting the amount of throttle operation, a water temperature sensor 53 for detecting the temperature of the cooling water and a voltage sensor 54 for detecting the battery voltage, and is supplied with data on the operating conditions of the engine. The microcomputer 4 computes the optimum ignition timing and the time of energization of the ignition oil on the basis of the rotational angle data from the reference angle sensor 1 and the angle sensor 2 and the data on the operating conditions from the operating-condition sensors 5, and produces an ignition signal (f). A power transistor 7 is driven through an output buffer 6 thereby to energize the ignition coil 8. By cutting off the energization at the time of ignition timing, a high voltage generated at that time is introduced through the distributor 9 to a spark plug 10 of a predetermined cylinder thereby to ignite the respective cylinders sequentially.

The microcomputer 4, as shown in FIG. 12, includes therein an output compare register (OCR) 4A for turning on and off the ignition signal (f), a free-running counter 4B which constantly runs free for indicating the present time point, and a timer control status register (TCSR) 4C for setting an output flag to determine whether the ignition signal (f) is set to "high" or "low" level. At the time point when the value set in the output compare register 4A coincides with the value in the present timer 4B, the ignition signal (f) is set to "high" or "low" level thereby to start or interrupt the energization of the ignition coil according to whether the output flag set in advance in the timer control status register 4C is "1" or "0". At the same time, the timer control status register 4C generates a required for output compare interrupt with the change in the output, thus making possible the output compare interrupt (OCI).

Figure 3:
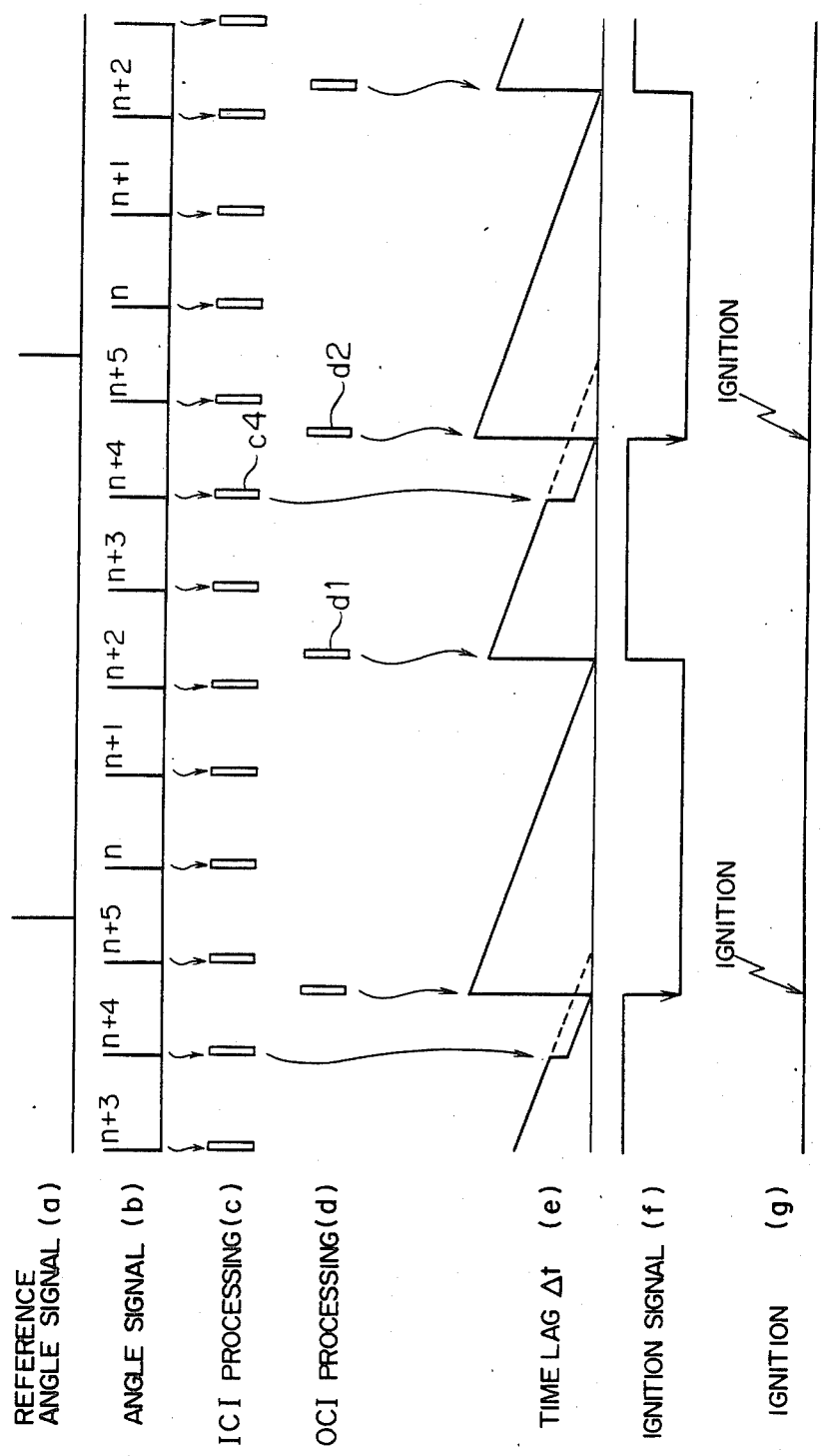
FIG. 3 is a timing chart showing an embodiment of the first aspect of the present invention.

A timing chart according to an embodiment of the first aspect of the present invention is shown in FIG. 3.

The reference angle signal (a) from the reference angle sensor 1 is supplied each 180° rotation (180°CA) of the crankshaft, and the angle signal (b) from the angle sensor 2 each 30° rotation (30°CA). Six angle signals (b) (n, n+1, ..., n+5) are applied during the intervals (T180) of the reference angle signal (a). Each time of input of the angle signal (b), the input capture interrupt (ICI) is executed. Actually, however, the significant processing is executed only by the ICI (c4) of the angle signal (such as n+4) supplied immediately before the ignition timing.

When the set value of the output compare register (OCR) coincides with the output of the free-running counter as the time lag $\Delta t(e)$ therebetween becomes zero, the output compare interrupt (OCI processing (d) is executed in response to the request therefor from the output compare register (OCR).

In the OCI processing (d1) at the time point when the energization of the ignition coil 8 is started by raising the ignition signal (f) to "high", the first means adds a value corresponding to a predetermined maximum energization time to the present time and setting the sum in the output compare register, while at the same time setting the value "0" for cutting off the energization in the timer control status register.

In the ICI processing (c4) at the time point of inputting the angle signal immediately before the ignition timing, the second means executes the process for correcting the set value of the output compare register to a value equal to the sum of the time representing the angle remaining before the ignition timing and the present time.

In the OCI processing (d2) at the time point when the time lag $\Delta t$ is reduced to zero, the ignition signal (f) is reduced to "low" level, the energization of the ignition coil 8 is cut off and the ignition (g) is started, the third means executes the process of adding value corresponding to the energization cut-off time computed to the present time and setting the sum thereof in the output compare register while at the same time setting the value "1" for starting the energization in the timer control status register.

More specific processes will be explained with reference to the flowcharts of FIGS. 4 to 6.

Figure 4:
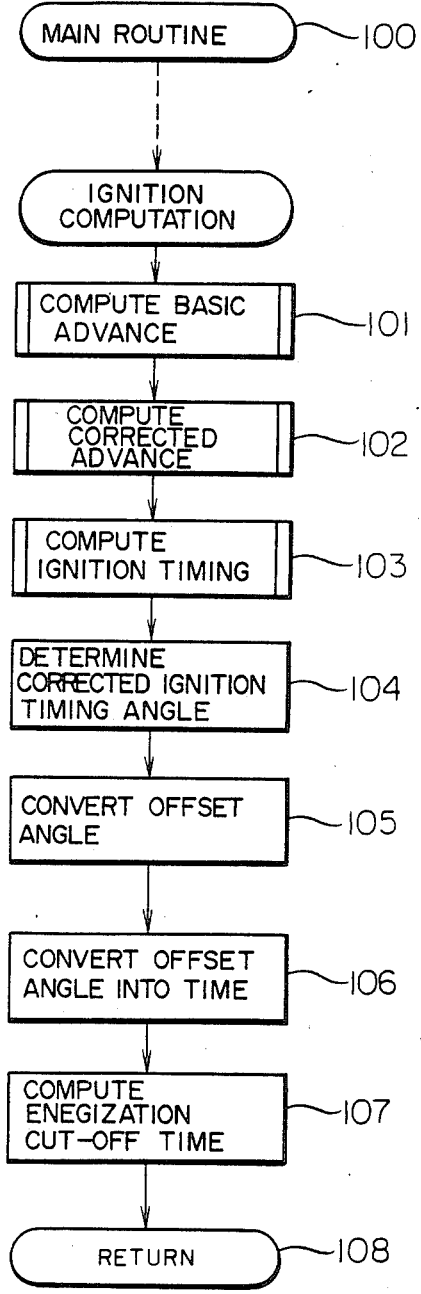
FIGS. 4 to 6 are flowcharts showing the processes in the microcomputer.

The process of the main routine 100 shown in FIG. 4 is normally repeatedly executed.

The step 101 computes the basic advance providing a basic ignition timing from the engine speed and the amount of intake air and stores it. Then, step 102 computes and stores a corrected advance providing a corrected amount of the basic advance from the temperature of the cooling water, the operating amount of the throttle, etc. Step 103 computes and stores the ignition timing from the basic advance and the corrected advance. Step 104 determined an angle at which an angle signal is generated immediately before the ignition timing and stores such an angle as a corrected ignition timing angle in a memory. Step 105 computes the angle remaining from the corrected angle to the ignition timing and stores it as an offset angle. Step 106 converts the offset angle into a time length from the engine speed and stores it as an offset time in a predetermined memory. Step 107 computes the energization cut-off time and stores it in a memory. In determining the energization cut-off time, a computation formula or a map is searched from the engine speed, battery voltage and the arc time for ignition start, and the required minimum energization time is computed by interpolation. Then, the energization time this computed is subtracted from the ignition cycle time to determine the energization cut-off time. In the main routine 100, the above-mentioned processes are executed repeatedly thereby to constantly update the data such as the offset time stored in a predetermined memory.

Figure 5:
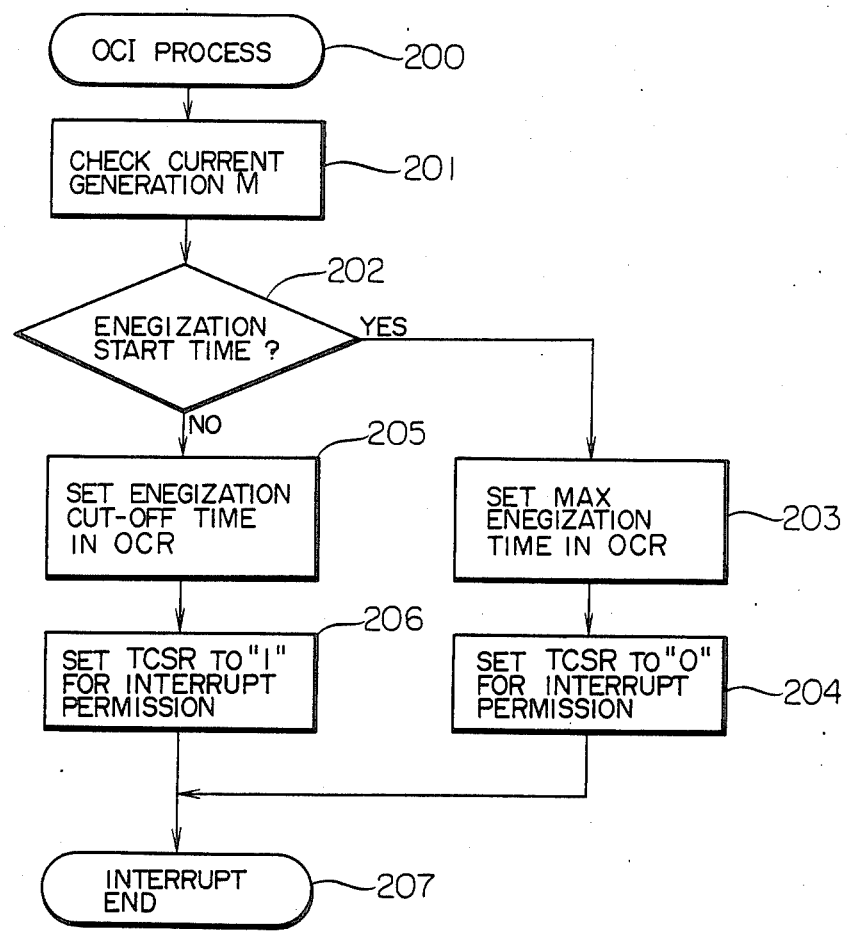

The output compare interrupt (OCI) shown in FIG. 5 is started when the time lag $\Delta t$ between the set value of the output compare register (OCR) and the free-running counter becomes zero.

Step 201 checks the timer control status register (TCSR) for the interrupt mode. Step 202 checks to see whether the interrupt under consideration is the one at the time of energization start, and if so, the process is passed to step 203. Step 203 sets in the output compare register a value corresponding to a predetermined maximum energization time plus the present time, followed by step 204 where "0" is set in the timer control status register to set an interrupt permission thereby to complete the interrupt process under consideration. If the interrupt under consideration is not the one for energization start in step 202, or if it is the interrupt for energization cut-off, then the process proceeds to step 205. Step 205 reads the energization cut-off time computed and stored in step 107, adds it to the present time, and sets the sum in the output compare register, followed by step 206 where "1" is set in the timer control status register to set an interrupt permission thus ending the interrupt process under consideration.

The steps 203 and 204 of the OCI process execute those of the first means mentioned above, and the steps 205 and 206 those of the third means.

Figure 6:
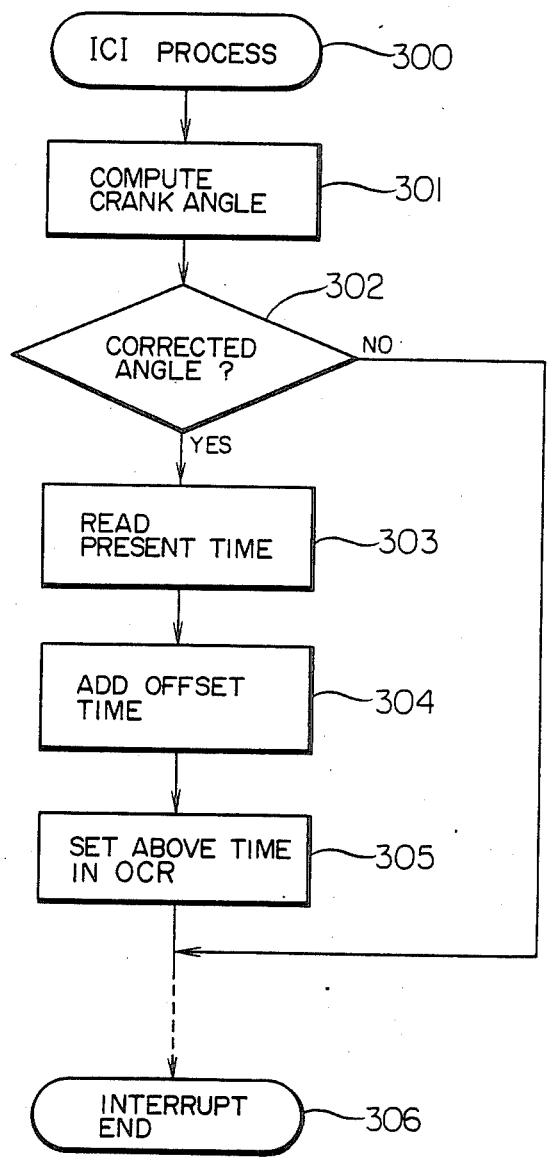

The input capture interrupt (ICI process) 300 shown in FIG. 6 is executed each time of input of the angle signal (b).

Step 301 computes the crank angle at the time of generation of the interrupt under consideration. Step 302 checks to see whether the crank angle under consideration is equal to the corrected ignition timing angle determined at step 104 of the routine 302. If it is not equal to the corrected ignition timing angle, nothing is executed but the interrupt process under consideration is ended. If it is the corrected ignition timing angle, on the other hand, the process proceeds to step 303. Step 303 reads the present time from the free-running counter, and step 304 adds the offset time determined at step 106 of the main routine 100 to the present time. Step 305 sets a value corresponding to this time in the output compare register thereby to end the interrupt process under consideration. The ICI 300 executes the process of the second means mentioned above.

Figure 7:
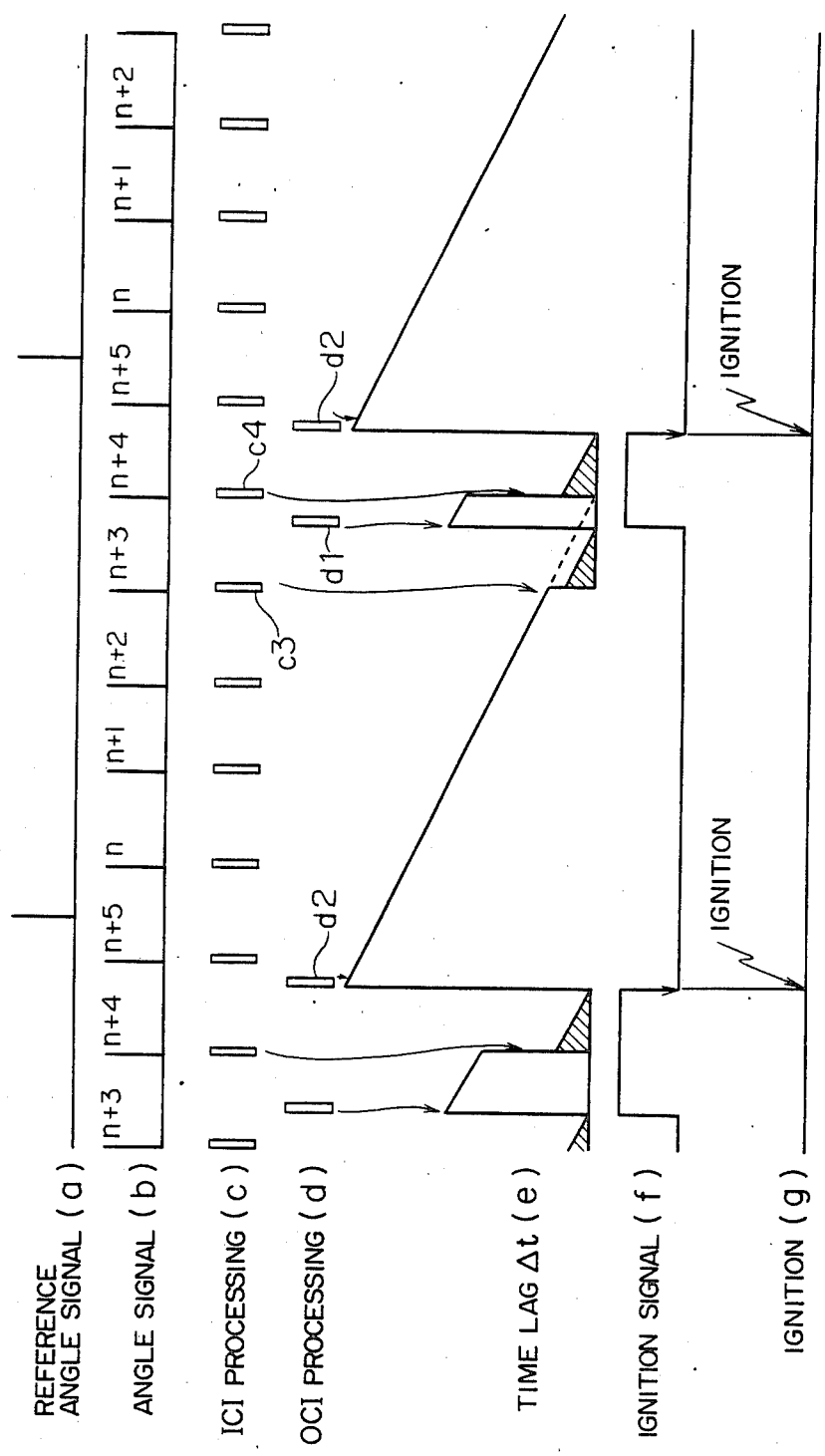
FIG. 7 is a timing chart showing an embodiment of the second aspect of the invention.

A timing chart according to an embodiment of the second aspect of the present invention is shown in FIG. 7.

In this embodiment, both the first and second aspects of the invention are embodied. The first to third means of the second aspect are realized as the first to third means of the first aspect respectively. Therefore, the OCI at the time of energization start (d1), the OCI at the time of energization cut-off (d2) and the ICI at the time of angle signal input immediately before the ignition timing (c4) are exactly the same as those in the first aspect of the invention described above. In the embodiment in question, as ICI step (c3) with an angle signal immediately preceding but one to the ignition timing is added as the fourth means. This ICI process (c3) checks to see whether or not the ignition coil is under energization, and if not, the same value as the value set in the next ICI process (c4) is set in the output compare register thereby to start energization early.

Explanation will be made of the actual processes in the microcomputer 4 with reference to the flowcharts.

The main routine normally executed and the OCI processes executed by the output compare interrupt are exactly the same as those (100 and 200) in the first aspect which has been explained with reference to FIGS. 4 and 5, the only difference from the first aspect being the ICI process by the angle signal interrupt.

Figure 8:
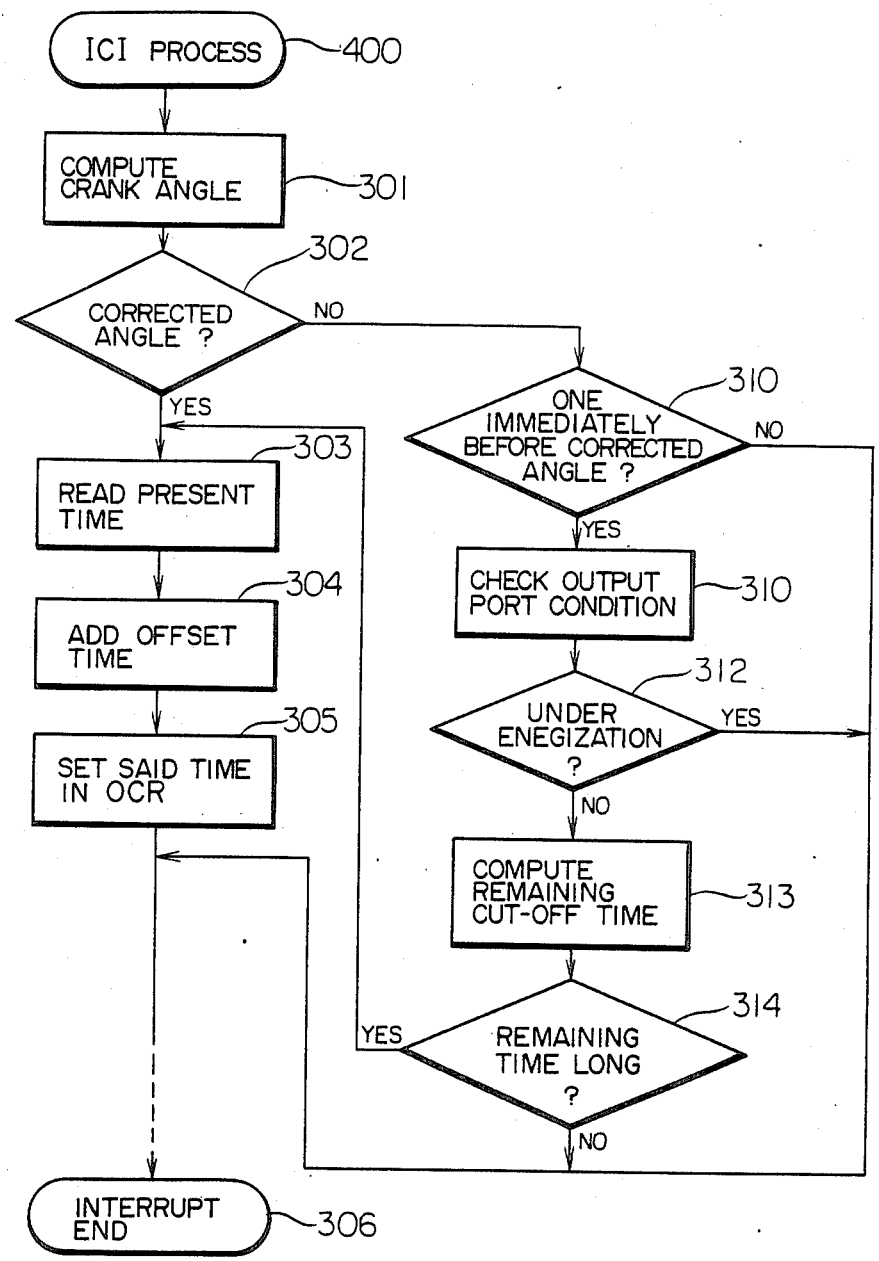
FIG. 8 is a flowchart.
Figure 9:
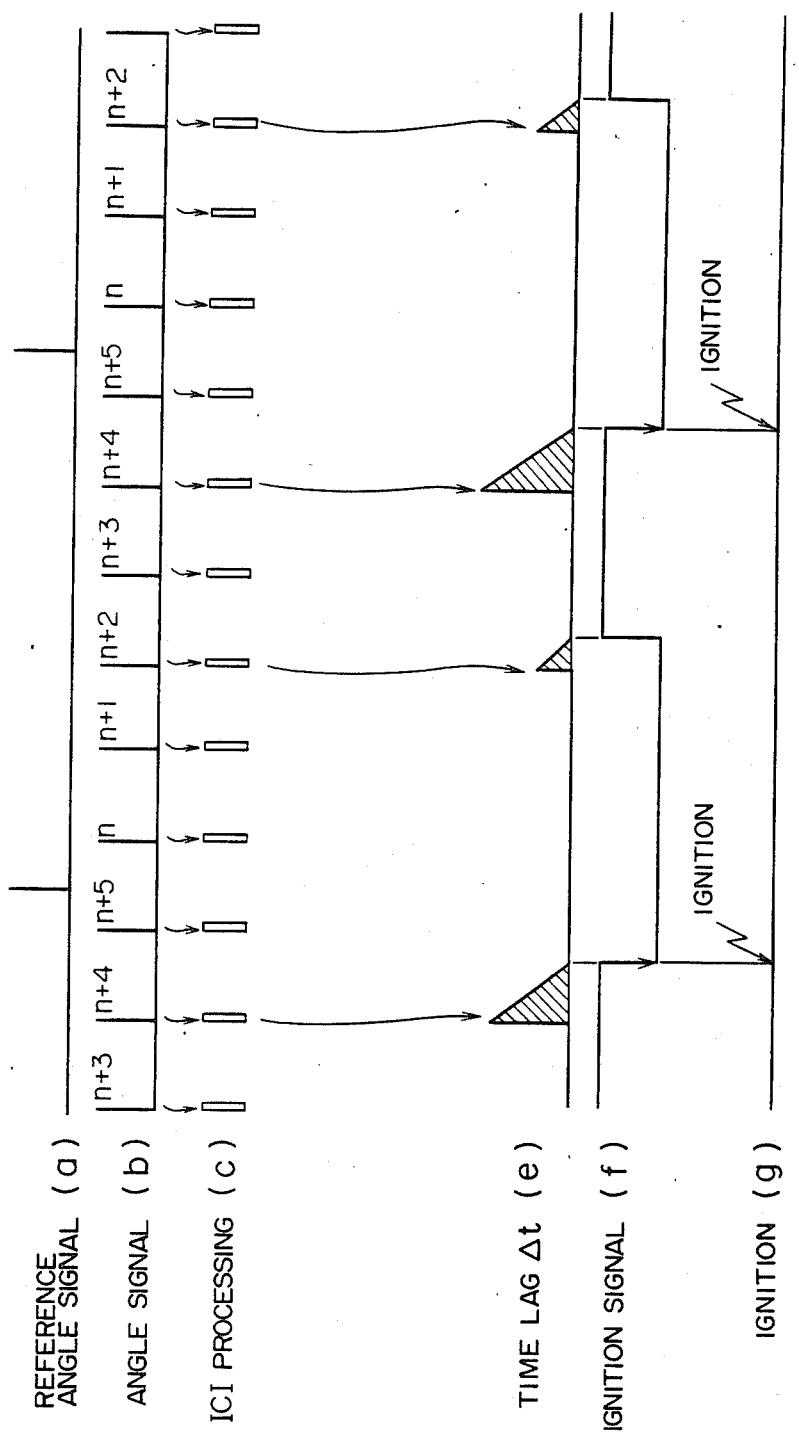
FIG. 9 is a timing chart showing the operation of a conventional system.
Figure 10:
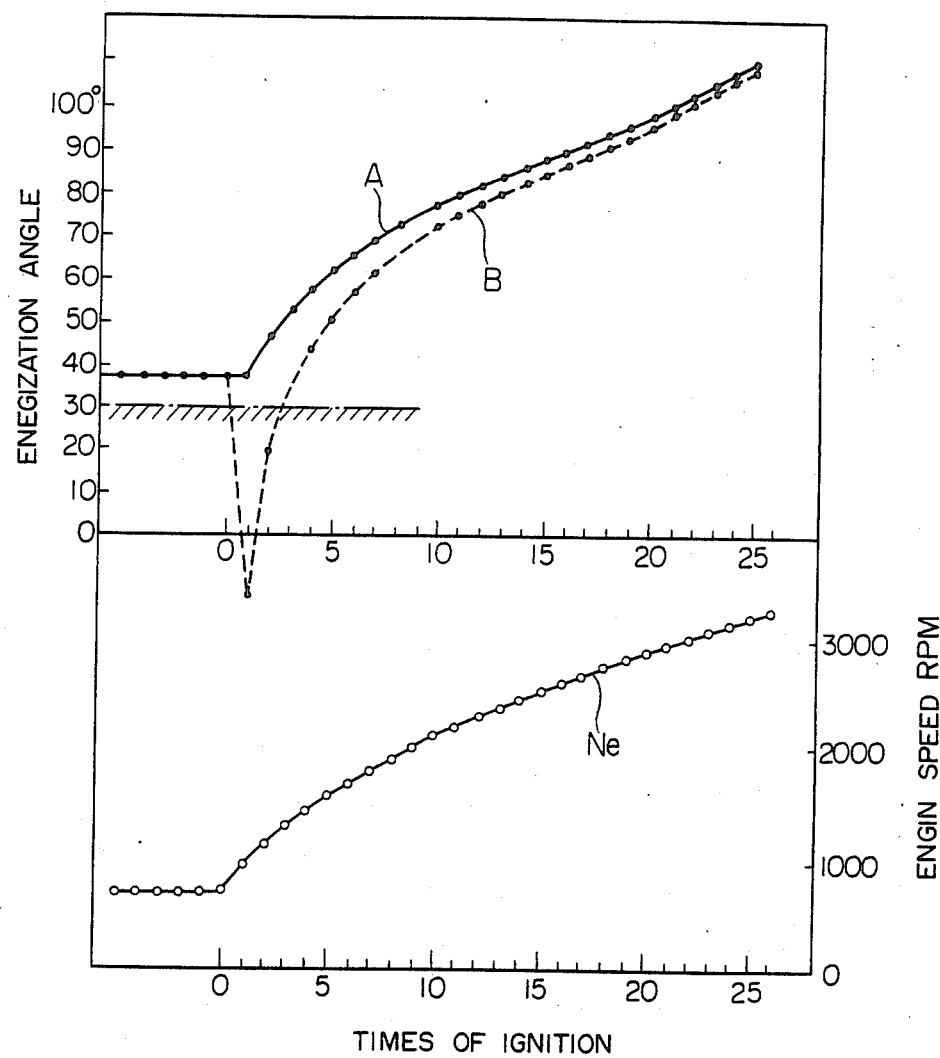
FIG. 10 is a characteristic diagram showing an energization angle or firing angle during abrupt acceleration in the conventional system.

A flowchart of the ICI process by the angle signal interrupt according to the second aspect of the invention is shown in FIG. 8. The steps for performing the same processes as the ICI in the first aspect of the invention shown in FIG. 6 are designated by the same reference numerals and will not be described again.

The ICI process 400 is executed each time of input of the angle signal (b). Steps 301 to 306 are the same as the ICI process explained with reference to FIG. 6. If the crank angle at the time of interrupt is equal to the corrected ignition timing angle, the process proceeds from step 302 to step 303 and so on, and the sum of the present time and the offset time is set in the output compare register thereby to end the interrupt processing. This process corresponds to the one executed by the second means of the second aspect of the invention, and is identical to the one executed by the second means of the first aspect.

If the crank angle at the time of interrupt is not equal to the corrected ignition timing angle, the process is passed from step 302 to step 310. Step 310 checks to see whether or not the interrupt under consideration is the one executed by the angle signal (n+3) immediately preceding to the corrected ignition timing angle, and if not, the interrupt process is ended without executing nothing. If it is the interrupt by the angle signal immediately preceding to the corrected ignition timing angle, by contrast, the process proceeds to step 311 to check the output port of the ignition signal (f) to see whether the ignition coil is under energization. If the ignition coil is under energization, the interrupt is ended without executing nothing, while if not under energization, the process proceeds to step 313. Step 313 computes the remaining energization cut-off time, followed by step 314 to see whether the remaining energization cut-off time is longer than the offset time determined at step 106 of the main routine 100. If the remaining energization cut-off time is shorter than the offset time, it indicates that the energization angle of 30° CA can be secured, and therefore the interrupt process is ended without executing nothing.

If the remaining energization cut-off time is longer than the offset time, on the other hand, it indicates that the energization angle of 30° CA cannot be secured, and therefore the process is passed to step 303 for executing the process of the fourth means to start energization early in forcible manner according to the second aspect of the invention. Step 303 reads the present time from the free-running counter, followed by step 304 for adding the present time to the offset time determined at the step 106 of the main routine 100. At step 305, a value corresponding to the time thus obtained is set in the output compare register (OCR) thereby to end the interrupt process. This process corresponds to the one executed by the fourth means of the second aspect of the invention. As a result, the energization cut-off time is corrected by the ICI process c3 by the angle signal (n+3) immediately preceding but one to the ignition timing, thus making it possible to secure the energization angle of 30° CA.

In the above-mentioned embodiment, the steps 313 and 314 checked to see whether the energization angle of 30° CA can be secured. Instead of this checking process, it is also possible to execute a simpler process in which if the ignition coil is not under energization, the process is passed from step 312 directly to step 303 to quicken the energization start time.

Further, without executing the OCI processes including the setting of the maximum energization time with respect to the first aspect of the invention embodied above, the second aspect of the invention may of course embodied independently so that the ignition may be controlled by the ICI process alone as in the prior art system shown in FIG. 8.

We claim:

1. An ignition control system for internal combustion engines comprising:
   a reference angle sensor for detecting the rotational speed of the internal combustion engine and generating a reference angle signal by discriminating a point near the top dead center;
   an angle sensor for detecting the rotational speed of the internal combustion engine and generating an angle signal by discriminating the revolutions for each predetermined angle; and
   a microcomputer including an output compare register, a free-running counter and a timer control status register for computing the ignition timing and the ignition coil energization time thereby to control the energization of the ignition coil in response to said reference angle signal, said angle signal and data on the operating conditions representing at least the amount of intake air,
   said microcomputer further including:
   output compare interrupt means for starting or cutting off the energization of the ignition coil in accordance with the value set in the timer control status register at the time point when the value on the output compare register coincides with that on the free-running counter, while at the same time meeting the request for the output compare interrupt in the microcomputer;
   first setting means for setting the sum of a value corresponding to a predetermined maximum energization time and the present time in said output compare register and setting a value for cutting off the energization in said timer control status register, when the energization of said ignition coil is started;
   second setting means for setting again in said output compare register the sum of a value corresponding to the time representing the angle remaining before said ignition timing and the present time at the time when the angle signal immediately before the ignition timing computed on the basis of said operating conditions is input; and
   third setting means for setting in said output compare register the sum of a value corresponding to the cut-off time computed on the basis of said operating conditions and the present time and setting a value for energization start in said timing control status register at the time point when the energization of the ignition coil is cut off.

2. An ignition system for internal combustion engines comprising:
   a reference angle sensor for detecting the rotational speed of the internal combustion engine and generating a reference angle signal by discriminating a point near the top dead center,
   angle sensor for detecting the rotational speed of the internal combustion engine and generating an angle signal by discriminating the revolutions for each predetermined angle; and
   a microcomputer including an output compare register, a free-running counter and a timer control status register for computing the ignition timing and the ignition coil energization time thereby to control the energization of the ignition coil in response to said reference angle signal, said angle signal and data on the operating conditions representing at least the amount of intake air,
   said microcomputer further including:
   output compare interrupt means for starting or cutting off the energization of the ignition coil in accordance with the value set in the timer control status register at the time point when the value on the output compare register coincides with that on the free-running counter, while at the same time meeting the request for the output compare interrupt in the microcomputer;
   first setting means for setting in said output compare register the sum of a value corresponding to the time before the energization cut-off time and the present time and setting a value for energization cut-off in said timer control status register;
   second setting means for setting again in said output compare register the sum of a value corresponding to the time representing the angle remaining before said ignition timing and the present time at the time point when the angle signal immediately before the ignition timing computed on said operating conditions is input;
   third setting means for setting in said output compare register the sum of a value corresponding to the time remaining before the energization start time and the present time and setting a value for energization start in said timer control status register; and
   fourth setting means for deciding whether the ignition coil is under energization and if the ignition coil is not energization, setting in the output compare register the same value as the one set in said output compare register by said second setting means, at the time point of application of the angle signal immediately preceding but one to the ignition timing.

3. An ignition control system according to claim 1, wherein said output compare interrupt means, said first setting means and said third setting means execute the output compare interrupt processing of said microcomputer,
   said output compare interrupt processing including:
   first means for checking the interrupt generation mode of said timer control status register;
   second means for determining whether said interrupt is the one at the time of energization start if said interrupt is generated;
   third means for setting the sum of a value corresponding to a predetermined maximum energization time and the present time in said output compare register if said interrupt is the one at the time of energization start;
   fourth means for setting "0" in said timer control status register after said setting by the output compare register at said third means;
   fifth means for setting the sum of a value corresponding to the energization cut-off time and the present time in said output compare register when said second step decides that said interrupt is the one at the time of energization cut-off; and
   sixth means for setting "1" in said timer control status register thereby to set an interrupt permission after said setting by said fifth means in said output compare register.

4. An ignition control system according to claim 1, wherein said second setting means executes the input capture interrupt processing of the microcomputer, said processing including:

first means for computing the crank angle at the time of generation of the interrupt under consideration;

second means for deciding whether the crank angle computed at the first means is equal to a corrected ignition timing angle;

third means for reading the present time from said free-running timer when said second means decides that said crank angle is equal to said corrected ignition timing angle;

fourth means for adding an offset time to the present time read out at said third means; and fifth means for setting in said output compare register a value corresponding to the time obtained at the fourth means.

* * * * *